United States Patent [19]

Brennan et al.

[11] 4,044,053
[45] Aug. 23, 1977

[54] PREPARATION OF POLYALKYLENE POLYAMINES

[75] Inventors: Michael E. Brennan; Philip H. Moss; Ernest L. Yeakey, all of Austin, Tex.

[73] Assignee: Texaco Development Corporation, New York, N.Y.

[21] Appl. No.: 682,823

[22] Filed: May 3, 1976

Related U.S. Application Data

[63] Continuation-in-part of Ser. No. 583,018, June 2, 1975, abandoned.

[51] Int. Cl.$^2$ .................. C07C 87/20; C07C 85/06
[52] U.S. Cl. .................. 260/583 P; 252/431 P; 260/584 R
[58] Field of Search ......... 260/583 P, 584 R, 268 SY, 260/585 B

[56] References Cited

U.S. PATENT DOCUMENTS

| | | | |
|---|---|---|---|
| 3,121,115 | 2/1964 | Meuly | 260/585 B X |
| 3,387,032 | 6/1968 | Leonard | 260/585 B |
| 3,520,933 | 7/1970 | Adam et al. | 260/585 R |

Primary Examiner—Daniel E. Wyman
Assistant Examiner—John J. Doll
Attorney, Agent, or Firm—Carl G. Ries; Thomas H. Whaley

[57] ABSTRACT

An improved process for selectively preparing a predominantly noncyclic polyalkylene polyamine compound is disclosed wherein an alkyleneamine compound is contacted with a diol compound in the presence of a catalytically effective amount of a phosphorus-containing substance at a temperature of from about 250° to about 350° C under a pressure sufficient to maintain the mixture essentially in liquid phase and the polyalkylene polyamine is then recovered from the resultant reaction mixture. In a preferred embodiment ethylenediamine is contacted with monoethylene diol to produce a predominantly linear polyethylene polyamine product with very low yields of heterocyclic amine materials. The desired polyethylene polyamines produced can be directly recovered from the reaction products by known purification procedures.

8 Claims, No Drawings

PREPARATION OF POLYALKYLENE POLYAMINES

CROSS-REFERENCE TO RELATED APPLICATIONS

This application is a continuation-in-part of application Ser. No. 583,018 filed June 2, 1975, now abandoned.

BACKGROUND OF THE INVENTION

1. Field of the Invention

This invention relates to the preparation of predominantly noncyclic polyalkylene polyamine products and more particularly pertains to a direct liquid phase catalytic process for synthesizing predominantly noncyclic trialkylenetetramines and higher odd alkylene homologs with low heterocyclic amine content.

2. Prior Art

Heretofore, polyalkylene polyamine compounds and particularly polyethylene polyamine compounds such as diethylenetriamine, triethylenetetramine, and the higher homologs as well as the related carbon-substituted homologs have been conventionally produced by reacting an alkyl halide, e.g., ethylene dichloride, with an amine compound such as ammonia, ethylenediamine, and the like at elevated temperatures and pressures. Generally speaking, relatively high yields of predominantly noncyclic polyethylene polyamine compounds are obtained along with varying yields of heterocyclic amines, e.g., piperazine materials. These processes, while generally employed throughout the industry, suffer from serious disadvantages.

Exemplary shortcomings of these procedures include large amounts of energy required to produce the reactants and expensive recovery procedures. The resultant hydrohalide salts of ammonia and the polyamines must undergo caustic neutralization to obtain the free polyamines. Separation of the desired free polyamines is difficult and disposal of the polluting by-products, such as the alkali metal halide salt, is expensive. Additionally, the products produced possess undesirable colorants, limiting use of the material in color-critical applications.

There are several procedures described in the literature for directly preparing predominantly noncyclic polyethylene polyamines by the condensation reaction of an aminoalkanol compound and an alkylatable amine compound which do not require neutralization of the reaction product to obtain the desired salt-free polyamines. For example see U.S. Pat. No. 3,714,259.

It has also been previously disclosed that certain phosphoric acid compounds are effective as catalysts in promoting condensation reactions between several types in amines, and aminoalkanols generally. The reaction conditions are relatively mild and/or the condensation sites are limited. For example, U.S. Pat. No. 3,121,115 to Meuly teaches a process for aminoalkylating certain amines having a replaceable amino hydrogen, particularly aromatic primary and secondary amines, which includes heating the amine compound with an N-tertiary aminoalkanol at from 150° to 250° C in liquid phase with continuous water removal in the presence of a phosphoric acid compound.

We have now discovered an improved catalytic process whereby predominantly noncyclic polyalkylene polyamines and particularly trialkylenetetramines and higher odd alkylene homologs such as pentalkylenehexamines may be selectively produced as the condensation product of a diol compound and preferably an alkylene diol compound, with an alkyleneamine compound under economically feasible short reaction times. The improved process provides conversion rates of reactants and selectivity comparable to or higher than those obtained by conventional processes which require neutralization with alkali, as described hereinbefore. In addition, condensation to selective alkyleneamines is possible by choosing appropriate diol reactants.

Surprisingly, it has been discovered that the condensation reaction may be carried out under rather severe processing conditions, such as temperatures above about 250° C in liquid phase without the expected decomposition and excessive by-product formation. For example, it is known that polyalkylene polyamines, and particularly the higher homologs of the ethylene amines such as triethylenetetramine, tetraethylenepentamine, etc., are thermally degradable. Moreover, experiments have shown that total reactants conversion is improved under these processing conditions while selectivity is substantially maintained as compared to the use of less severe processing conditions.

The process of the instant invention is further surprising in light of the disclosure that the vapor phase reaction involving ethylenediamine compound and a polyhydric alcohol in the presence of a thorium sulfate catalyst yields only the corresponding N-alkylated amine compound and not the polyalkylene polyamines. See for example U.S. Pat. No. 3,732,311.

SUMMARY OF THE INVENTION

In accordance with the broad aspects of the instant invention, predominantly noncyclic polyalkylene polyamines are selectively produced directly from an alkyleneamine compound and a diol compound by a process which includes contacting the alkyleneamine compound with the diol compound in the presence of a catalytically effective amount of a phosphorus-containing substance at temperatures of from about 250° to about 350° C under a pressure sufficient to maintain the mixture essentially in liquid phase. The polyalkylene polyamines thus produced are then recovered from the resultant reaction mixture.

In accordance with one embodiment, an n-alkylene diamine having two primary terminal amino groups is contacted with the corresponding n-alkylene diol having two terminal primary hydroxy groups to produce trialkylenetetramines or higher odd alkylene homologs.

In accordance with a preferred embodiment, ethylenediamine is contacted with monoethylene diol to produce predominantly noncyclic polyethylene polyamines such as triethylenetetramine, and pentaethylenehexamine.

DESCRIPTION OF THE PREFERRED EMBODIMENT

Briefly, the present invention is an improved process for synthesizing predominantly noncyclic polyalkylene polyamines and preferably predominantly linear polyethylene polyamines such a triethylenetetramine and higher odd alkylene homologs. The inventive process involves contacting an alkyleneamine having primary amino groups, and preferably having an unbranched alkylene moiety such as ethylenediamine, with a diol having primary or secondary hydroxy moieties and preferably having an unbranched alkylene moiety, in the presence of a catalytically effective amount of a phosphorus-containing substance. The reactants are contacted at a temperature of from above about 250° to about 350° C under a pressure sufficient to maintain the reaction mixture essentially in liquid phase. The predominantly noncyclic polyethylene polyamines produced are recovered directly such as by conventional distillation techniques in high quality yields without any requirement of neutralization by the addition of alkali. The process provides acceptable conversion levels under relatively short reaction times, usually about ½ to 5 hours. Unexpectedly, formation of cyclic products, such as piperazine compounds, and excessively branched products is comparable to or below the amount normally obtained in conventional procedures for preparing polyethylene polyamines where neutralization procedures are required.

An outstanding advantage of the instant invention resides in the fact that the polyalkylene polyamine desired may be selectively produced by selection of particular rectants. For example, it will be realized that a trialkylenetetramine compound is the lowest alkyleneamine homolog that can be produced. Specifically 2 moles of the alkyleneamine reactant are theoretically required to react with a single mole of the diol reactant. Thus, if for example, ethylenediamine and ethylene diol are utilized, triethylenetetramine and pentaethylenehexamine are obtained.

Generally, the polyalkylene polyamines that are produced in accordance with the instant invention can be depicted by the formula:

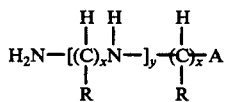

wherein R is hydrogen or a lower alkyl radical; A is a primary amine or a hydroxy group; $x$ is a number from 2 to about 6; and $y$ is a number from 2 to about 6. When A is a primary amine, $y$ is an even integer from 2 to 6, thus giving the "odd alkylene" amine product.

It will be realized by those skilled in the art that when A is a hydroxy group, the product formed is in a broad sense an alkanolamine. Preferably, the process of the instant invention is run in the presence of excess polyalkylene polyamine reagent to minimize the amount of alkanol amine formed. In any event the alkanolamine produced can be separated from the reaction product by for example fractional distillation during the recovery step and recycled for production of higher homolog products if desired. Examples of polyalkylene polyamines are tripropylenetetramine, tributylenetetramine, tri-2-methylethylenetetramine, tri-2-ethylethylenetetramine and the like. This list is exemplary and not means to be exhaustive of the polyalkylene polyamine compounds that can be formed.

The most preferred polyalkylene polyamine is a polyethylene polyamine of the above formula wherein A is an amine, R is hydrogen $x$ is 2 and $y$ is an even integer from 2 to 4. Examples of such compounds are triethylenetetramine, pentaethylenehexamine and the like.

The alkyleneamine reagent that can be used in accordance with the invention contains two terminal primary amino groups. Alkyleneamines that are particularly useful can be depicted by the general formula:

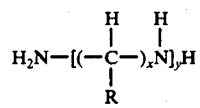

wherein R is a hydrogen or a lower alkyl radical, $x$ is a number from 2 to about 6 and $y$ is a number from 1 to about 4. The most preferred alkyleneamine reagent is ethylenediamine.

The diol that can be used contains primary or secondary hydroxy moieties. The diol compounds which are most useful include those represented by the formula:

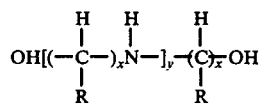

where R is a hydrogen or a lower alkyl radical; $x$ is a number from 2 to about 6; and $y$ is a number from 0 to about 3. The most preferred diol is an ethylene diol of the above formula wherein R is hydrogen, $x$ is 2 and $y$ is 0.

It should be realized that in accordance with the invention, when $y$ becomes greater than 0, i.e., secondary nitrogen moieties are present in the chain, cyclization of the dialkanolamine is likely to occur, diminishing the yield of the noncyclic product.

Suitable phosphorus-containing substances which can be employed include, for example, acidic metal phosphates, phosphoric acid compounds and their anhydrides, phosphorous acid compounds and anhydrides, alkyl or aryl phosphate esters, alkyl or aryl phosphite esters, alkyl or aryl substituted phosphorous acids and phosphoric acids, alkali metal monosalts of phosphoric acid, the thioanalogs of the foregoing, and mixtures of any of the above.

More particularly, suitable acidic metal phosphates include boron phosphate, ferric phosphate, aluminum phosphate, etc.

Suitable phosphoric acid compounds include aqueous or anhydrous phosphoric acids such as orthophosphoric acid, pyrophosphoric acid, metaphosphoric acid, and condensed phosphoric acids such as polyphosphoric acids. Accordingly, an example of a suitable phosphorous acid is orthophosphorous acid.

In addition, any commercially available mono-, di-, or tri-alkyl or aryl phosphate or phosphite ester can be employed as the catalyst in the inventive process. Additionally, bis(phosphates) and secondary phosphate esters such as those disclosed in U.S. Pat. Nos. 3,869,526 and 3,869,627, respectively, can be used. Preferably, the lower alkyl esters are employed such as those having from 1 to about 8 carbon atoms per alkyl group. Preferred aryl esters contain from about 6 to about 20 carbon atoms and may include a phenyl group or alkyl-substituted phenyl group.

Further, suitable alkyl or aryl substituted phosphoric acids or phosphorous acids which may be employed as a catalyst include alkyl phosphonic acids, aryl phosphonic acids, alkyl phosphinic acids and aryl phosphinic acids. Preferably, such acids include alkyl or aryl groups and have from 1 to about 8 carbon atoms in each alkyl group and about 6 to about 20 carbon atoms in each aryl group.

Specific examples of alkyl and aryl substituted phosphorous and phosphoric acids that may be used in accordance with the invention are phenylphosphinic, ethylphosphonic, phenylphosphonic, naphthaphosphonic, and methylphosphinic acids. Examples of the alkyl and aryl substituted phosphorous and phosphoric acid esters are methylphenyl phosphonate, dimethylphenyl phosphonate, methylphenyl phosphinate, ethyl naphthaphosphinate, and propylmethyl phosphonate.

The above-mentioned phosphorus compounds are not intended to be exhaustive of those which may be employed as a catalyst material in the process of the present invention. Those materials are set forth to specify types of phosphorus compounds that we have found to be particularly effective as catalysts. Yet, of the compounds and types of compounds mentioned, we especially prefer to employ those that have been found to be most reactive under the processing conditions of the invention. These especially preferred compounds include boron phosphate, aqueous and anhydrous orthophosphoric acid, polyphosphoric acid, aluminum phosphate, ferric phosphate, aqueous and anhydrous orthophosphorous acid, triethylphosphite, triethylphosphate, and diethylphosphite, to name a few. Only a catalytically effective amount of the phosphorus substance is required to effect the condensation reaction between the reactants resulting in the formation of essentially salt-free predominantly non-cyclic polyethylene polyamines in good yield.

The quantity of phosphorus compound employed as the catalyst in the inventive process may vary widely, depending upon its reactivity, the reactants present and particular processing conditions employed. Usually this catalytic amount is within the range of from about 0.01 to about 10.0 wt. %, based upon the amount of diol compound material present; and preferably the catalyst is employed in an amount of from about 0.5 to about 5.0 wt. % based upon the amount of diol compound.

Any of the above-mentioned phosphorus compounds may be employed as the catalyst of the process either alone, in combination with one of the other mentioned phosphorus compounds, or in combination with acidic compounds such as boric acid and the like. These latter acid compounds are generally ineffective as catalysts by themselves in the inventive process.

According to a greatly preferred embodiment, monoethylene diol and ethylenediamine are intimately contacted by admixing. The mixture is heated in the presence of the phosphorus-containing substance at a temperature of from about 250° to about 350° C and preferably at a temperature of about 275° to about 325° C, under a pressure sufficient to maintain the reaction mass in liquid phase which normally ranges from about 200 to about 2,000 psig. The reaction is allowed to proceed at the temperature employed until the desired amount of conversion is obtained. Preferably the reaction is carried out under such conditions for a time period sufficient to provide a total reactants conversion of from about 10% to about 75% which is usually within the range of about 0.5 to about 5.0 hours.

When used, the monoethylene diol and the ethylenediamine are contacted for reaction at molar ratios of from about 2:1 to about 1:5. Preferably, the ethylenediamine compound is employed in excess, such as about 1:2 to about 1:4 moles monoethylene diol per mole of ethylenediamine.

Generally the process of the invention can be carried out batchwise or continuously employing well-known batch and continuous processing techniques and conventional processing apparatus. Where the process is carried out continuously, we prefer to employ space velocities of reactants of from about 0.1 to about 4, and preferably from about 0.5 to 1.5, grams total reactants per milliliter of total reactor volume per hour.

In such continuous reaction processes, the above-described phosphorus-containing catalyst materials may be employed as a feed stream along or admixed with a reactant feed stream, or they may be employed as a fixed bed catalyst in the continuous reactor system. Generally speaking, these fixed bed catalysts comprise the phosphorus-containing catalyst material supported on a material such as silica, silica-alumina, alumina, diactomaceous earth, etc., conventionally employed as inert reactor packing materials. Such fixed bed supported catalysts and procedures for their preparation are well-known in the art and many are readily available commercially.

It is not critical to control the amount of water of reaction present during the heating of reactants and catalyst, such as by removal thereof as it is formed. Usually, we prefer to retain the water in the reaction zone and remove it from the reaction mass during recovery of the predominantly non-cyclic polyalkylene polyamines.

The desired mainly non-cyclic polyalkylene polyamine compounds may be readily recovered from the reaction product mass by conventional procedures, such as distillation, without difficulty. For example, the reaction product mass may be directly distilled, or initially filtered to remove a small amount of formed solids which usually are amine salt complexes of the phosphorus compound catalyst, and then distilled. The desired polyalkylene polyamine compounds may then be separately collected overhead in salt-free form. Such distillation recovery procedures are well-known in the art and, therefore, will not be more particularly discussed herein.

One outstanding advantage of the instant invention resides in the fact that alkylene polyamines after separation by, for example fractional distillation, can be returned to the reaction zone to undergo further reaction with diols, thus producing more of the higher homolog products. Those skilled in the art will immediately see the many ways of selectively obtaining a desired product by use of reactants, reaction conditions, recycling techniques and the like.

The following examples illustrate the nature of the invention process but are not intended to be limitative thereof.

EXAMPLE I

To a dry, nitrogen purged 1-liter stainless steel autoclave equipped with stirring means was charged a solution of 62.0 g. (1.0 moles) monoethylene diol (ED) and 180.0 g. (3.0 moles) ethylenediamine (EDA) and 4.0 g. 30% phosphorous acid (1.9 wt. %; 1.5 mole % basis monoethylene diol). The autoclave contents were padded with nitrogen and heated to 290° C for 2.0 hours under a pressure of 425 to 540 psig. Analysis of the liquid reaction product effluent by gas-liquid chromatography (GLC Area %, lights-water free basis) showed a total conversion of 29.9% which contained 67.9 ethylenediamine, 7.6 monoethylene diol, 2.7 piperazine, 0.1 unknown, 1.2 diethylenetriamine, 6.8 N-(2-aminoethyl)ethanolamine, 0.8 N-(2-aminoethyl)-piperazine/N-(2-hydroxyethyl)piperazine, 11.2 triethylenetetramine isomers (83.6% linear triethylenetetramine), 0.3 tetraethylenepentamine, and 1.4 pentaethylenehexamine plus heavies. This example illustrates the effectiveness of employing monoethylene diol in the process of the invention.

EXAMPLES II-V

In these examples the general procedure of Example I was followed except that various changes in catalyst were investigated. Each reaction was generally carried out in the 1-liter autoclave of Example I which was charged with a solution of 180.3 g. (3.0 moles) of ethylenediamine (EDA) and 62.1 g. (1.0 moles) of monoethylene diol (ED) with the indicated catalyst at the concentration of Example I (0.0488 moles catalyst). As in Example I, the autoclave contents were padded with nitrogen and heated at 290° C for 2 hours under the indicated pressure. The data are presented in the following Table I.

TABLE I

| Experiment No. | Catalyst | Press. Psig. | % Conv. EDA | % Conv. ED | Total | EDA | ED | Pip. | Unks. | DETA | AEEA | AEP-HEP | TETA | (% NC) | TEPA | PEHA |
|---|---|---|---|---|---|---|---|---|---|---|---|---|---|---|---|---|
| 2 | 85% H₃PO₄ | 415–550 | 29.0 | 80.8 | 39.8 | 62.3 | 4.4 | 5.4 | 0.1 | 1.1 | 7.6 | 1.3 | 15.4 | (82.7) | 1.1 | 1.1 |
| 3 | BPO₄ | 450–575 | 35.7 | 84.6 | 45.9 | 59.1 | 3.7 | 5.3 | 0.9 | 2.3 | 5.1 | 1.8 | 17.9 | (82.9) | 1.1 | 2.7 |
| 4 | φP(O)(OH)₂ | 505–650 | 32.1 | 86.5 | 43.4 | 61.3 | 3.2 | 4.1 | 5.4 | 2.8 | 5.0 | 2.2 | 11.4 | (75.7) | 2.7 | 1.9 |
| 5 | (EtO)₃PO | 540–1125 | 54.3 | 83.2 | 60.3 | 42.2 | 4.1 | 10.9 | 8.9 | 3.2 | 6.3 | 5.3 | 15.0 | (72.5) | 1.9 | 2.1 |

EDA = ethylenediamine
ED = monoethylene diol
Pip = piperazine
Unks = unknowns
DETA = diethylenetriamine
AEEA = aminoethylenethanolamine
AEP-HEP = aminoethylpiperazine/hydroxyethylpiperazine
TETA = triethylenetetramine
% NC = % noncyclic (linear triethylenetetramine)
TEPA = tetraethylpentamine
PEHA = pentaethylenehexamine

EXAMPLE VI

Generally employing the procedure and equipment of Example I, 270.4 g. (4.5 moles) ethylenediamine, 114.1 g. (1.5 moles), 1,2-propylene glycol and 8.4 g. (0.0732 moles) of 85% $H_3PO_4$ were charged into a nitrogen purged 1-liter stainless steel autoclave. The clave contents were then padded with nitrogen and heated to 290° C for 2 hours under a pressure that varied from 400–500 psig. The product effluent upon analysis by gas liquid chromatography (GLC), Area % (lights-water free basis) showed a total conversion of 18.3%. The EDA conversion was shown to be 16.7% and the 1,2-propylene glycol 22.5%. The effluent analysis was as follows: EDA, 62.9%; 1,2-propylene glycol, 22.3%; methyltriethylenetetramine, 6.4%, methylaminoethylethanolamine, 4.4%; methyldiethylenetriamine, 1.4%; 2-methylpiperazine, 1.0%; unknowns, 1.3%; heavies and fractional products, 0.5%. The example shows the use of a dial having both a primary and a secondary hydroxy moiety. It will be realized that in accordance with the instant invention the monohydroxyamine intermediate can be recycled.

It is to be understood that various modifications of these examples will become apparent to those skilled in the art upon reading the specification which is intended to cover such modifications as fall within the scope of the appended claims.

What is claimed is:

1. A process for preparing noncyclic polyalkylene polyamines comprising the steps of:

contacting an alkyleneamine compound having two primary amino groups of the formula:

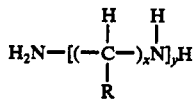

wherein R is a hydrogen or a lower alkyl, x is a number from 2 to about 6 and y is a number from 1 to about 4 with a diol having primary or secondary hydroxy groups of the general formula:

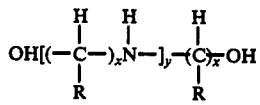

where R is a hydrogen or a lower alkyl; x is a number from 2 to about 6; and y is a number from 0 to about 3 in the presence of a catalytically effective amount of the phosphoruscontaining substance selected from the group consisting of acidic metal phosphates, phosphoric acid compounds and their anhydrides, phosphorous acid compounds and their anhydrides, alkyl or aryl phosphate esters, alkyl or aryl phosphite esters, alkyl or aryl substituted phosphorous acids and phosphoric acids wherein said alkyl groups have from 1 to about 8 carbon atoms and said aryl groups have from 6 to about 20 carbon atoms, alkali metal monosalts of phosphoric acid and mixtures of the above at temperatures of from about 250° to about 350° C under a pressure sufficient to maintain the mixture essentially in liquid phase wherein said alkyleneamine compound is present in molar excess; and, recovering said polyalkylene polyamine compound from the resultant reaction mixture.

2. The process of claim 1, wherein said phosphorus-containing substance is present in an amount of from about 0.1 to about 10.0 weight percent based upon the amount of said diol present.

3. The process of claim 2, wherein said mixture is heated in the presence of said phosphorus-containing substance at a temperature of from about 275° to about 325° C.

4. The process of claim 3, wherein said diol compound and said alkyleneamine compound are contacted in a molar ratio of from about 2:1 to about 1:5.

5. The process of claim 4 wherein said diol is an ethylene diol of the formula:

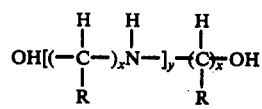

wherein R is hydrogen, x is 2 and y is 0 to 3 and wherein the alkyleneamine is an ethyleneamine of the formula:

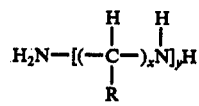

wherein R is hydrogen, x is 2 and y is a number from 1 to about 4.

6. The process of claim 5 wherein said ethylene diol is monoethylene diol, wherein said ethyleneamine is ethylenediamine and wherein said phosphorus-containing substance is phosphorous acid.

7. The process of claim 5 wherein said phosphorus-containing substance is an acid metal phosphate selected from the group consisting of boron phosphate, ferric phosphate and aluminum phosphate.

8. The process of claim 5 wherein sid phosphorus compound is selected from a group consisting of phenylphosphinic acid, ethylphosphinic acid, phenylphosphonic acid, naphthaphosphonic acid, methylphosphinic acid, methyl phenylphosphinate, dimethyl phenylphosphonate, ethyl phenylphosphinate and propyl methylphosphonate.

* * * * *